United States Patent
Masseth

Patent Number: 5,374,142
Date of Patent: Dec. 20, 1994

[54] TIP RELIEF CUTTER BLADES

[75] Inventor: John E. Masseth, Fort Wayne, Ind.

[73] Assignee: Dana Corporation, Toledo, Ohio

[21] Appl. No.: 985,571

[22] Filed: Dec. 3, 1992

[51] Int. Cl.$^5$ .............................................. B23F 21/23
[52] U.S. Cl. ....................................... 407/23; 407/26; 407/21; 407/25; 407/113
[58] Field of Search .................. 407/23, 24, 26, 20, 407/21, 22, 25, 113

[56] References Cited

U.S. PATENT DOCUMENTS

| | | |
|---|---|---|
| 1,490,457 | 4/1924 | Eberhardt . |
| 2,270,003 | 1/1942 | Head ................................ 407/22 |
| 2,329,804 | 9/1943 | Wildhaber . |
| 2,437,902 | 3/1948 | Wildhaber . |
| 2,718,176 | 9/1955 | King . |
| 2,857,819 | 10/1958 | Wildhaber et al. ............... 407/21 |
| 2,974,398 | 3/1961 | Spear ................................ 407/21 |
| 2,978,792 | 4/1961 | Slayton ............................. 407/22 |
| 3,268,980 | 8/1966 | Blakesley et al. ................ 407/22 |
| 3,715,789 | 2/1973 | Johnson ........................... 407/26 |
| 4,060,881 | 12/1977 | Ryan et al. ...................... 407/22 |
| 4,260,299 | 4/1981 | Ryan et al. ...................... 407/22 |
| 4,575,285 | 3/1986 | Blakesley ......................... 407/22 |
| 4,575,286 | 3/1986 | Blakesley ......................... 407/22 |
| 4,666,348 | 5/1987 | Corrette .......................... 407/24 |
| 5,058,449 | 10/1991 | Lindsey . |

FOREIGN PATENT DOCUMENTS

| | | | |
|---|---|---|---|
| 0059848 | 6/1920 | Sweden ............................. | 407/23 |
| 0069798 | 12/1913 | Switzerland ....................... | 407/23 |

Primary Examiner—P. Austin Bradley
Assistant Examiner—Erik R. Puknys
Attorney, Agent, or Firm—MacMillan, Sobanski & Todd

[57] ABSTRACT

A cutter blade for use with a face hob type cutter for producing the teeth of spiral bevel and hypoid gear members by a continuous index, face hobbing process comprises a cutter blade shank having a cutting member provided at one end thereof. The cutting member includes a tooth cutting edge having a given axial pressure angle, and a relief edge adjacent the tooth cutting edge having an axial pressure angle greater than the axial pressure angle of the tooth cutting edge. The relief edge of the cutting member simultaneously forms a relief on the tip of the tooth of the gear member as the tooth is cut by the tooth cutting edge of the cutting member.

12 Claims, 1 Drawing Sheet

TIP RELIEF CUTTER BLADES

BACKGROUND OF THE INVENTION

1. Field of the Invention

The invention relates to cutter blades for the production of gears and, more particularly, to cutter blades for the face hobbing of parallel depth spiral bevel and hypoid gears.

2. Summary of Related Art

Spiral bevel and hypoid gear pairs are conventionally produced utilizing either an intermittent index face milling method or a continuous indexing face hobbing method. While most gear set manufacturers currently use the face milling method, the face hobbing process has been recently adopted by some manufacturers, especially those manufacturing such gear sets for vehicular applications. In a face hobbing machine, a circular face hob type cutter carrying a plurality of cutter blades is utilized, and the cradle, work and cutter axes rotate in a timed relationship until the entire part is completed. During the cutting process, the work and cutter continuously rotate, with successive cutter blade groups engaging successive tooth slots as the gear or pinion member is being cut. Advantageously, the face hobbing method produces uniform depth teeth, and parts are produced from the solid in one operation. The face hobbing method also requires fewer production steps and less production time than the face milling method.

In general, producers of gears have found it beneficial to apply a relief or chamfer to the tip of the teeth of the gear member, the pinion member, or both members of the gear set to reduce the noise which typically results from the operation of the gear set. Nonetheless, such a tip relief is typically not provided on face hobbed spiral bevel or hypoid gear sets. Rather, after the teeth have been cut, the tips thereof have been merely rounded off by means of a separate operation. Where a tip relief has been provided, the relief has been produced in an operation separate from, and subsequent to, the tooth cutting operation. In either case, the additional production step is generally disadvantageous with regard to cost, quality control, and manufacturing flexibility.

SUMMARY OF THE INVENTION

The present invention relates to a cutter blade for use with a face hob type cutter for producing the teeth of spiral bevel and hypoid gear members by a continuous index, face hobbing process. The cutter blade comprises a cutter blade shank adapted to be mounted on a rotatable cutter body, and a cutting member provided at one end of the blade shank. The cutting member includes a tooth cutting edge having a given axial pressure angle, and a relief edge adjacent the tooth cutting edge having an axial pressure angle greater than the axial pressure angle of the tooth cutting edge. The relief edge of the cutting member simultaneously forms a relief on the tip of the tooth of the pinion or gear member as the tooth is cut by the tooth cutting edge of the cutting member.

Producing a tip relief simultaneously with the cutting operation allows for greater manufacturing flexibility, as the relief dimensions can be easily modified simply by altering the cutter blades of the face hobbing machine. In addition, the elimination of a subsequent manufacturing operation improves the consistency of the relief dimensions and part quality, as well as reduces manufacturing time and costs.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is a perspective view of a face hob type cutter head in accordance with the present invention.

DESCRIPTION OF THE PREFERRED EMBODIMENTS

Figure 1:
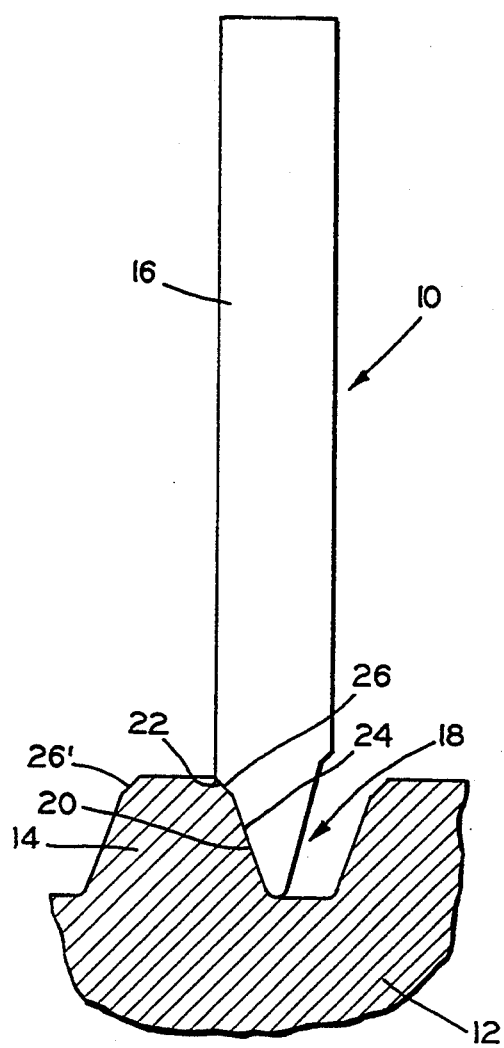
FIG. 1 is a plan view of the front face of a tip relief cutter blade in accordance with the present invention and a portion of a gear member on which the cutter blade is operating.

Referring now to the drawings, there is illustrated generally at 10 in FIG. 1 a tip relief cutter blade in accordance with the present invention and a portion of a gear member 12 having a gear tooth 14 on which the cutter blade is operating during the face hobbing process. The cutter blade 10 includes a shank 16 and a cutting member 18 at one end thereof. A plurality of the cutter blades 10 are mounted on a rotatable, circular cutter head 19 as part of a face hobbing system. Examples of such systems include the Phoenix system and G-MAXX 2010 system, both available from The Gleason Works, Division of Gleason Corporation, Rochester, N.Y. During the face hobbing process, the gear member 12 and cutter head 19 continuously rotate, with successive cutter blades engaging successive tooth slots as the gear member is being cut. While a gear member 12 is illustrated in FIG. 1, the tip relief cutter blade of the present invention is equally applicable to the face hobbing of the pinion member of a gear set.

Face hobbing cutting systems generally utilize cutter blades which are profile relief ground at the end user's facility from uniform blanks to afford a variety of specified configurations. The front face of the cutting member 18 of each cutter blade 10 is provided, generally/ on only one side thereof, with a cutting edge 20 extending from the tip of the cutting member 18 at a predetermined axial pressure angle. The axial pressure angle of the cutting edge 20 obviously depends on the angle desired for the sides of the gear teeth As used herein, "axial pressure angle" is defined as the angle between the blade edge (or tooth profile) and the axis of the cutter blade 10. The cutter blades 10 are generally mounted on the cutter head 19 in groups. For instance, in the systems offered by The Gleason Works, the cutter blades are arranged on the cutter head 19 in groups of two, each cutter blade pair operating on a different tooth space. In other systems, the cutter blades may be arranged on the cutter head in groups of three. In such systems, there is an inner, outer and rougher blade which operate to cut the sides and bottom of each tooth space, respectively. The rougher cutter blade (not shown) is generally provided with both inner and outer cutting edges. The cutter blade 10 illustrated in the drawings is one of the side cutting blades suitable for use with either a two blade or a three blade group.

Figure 2:
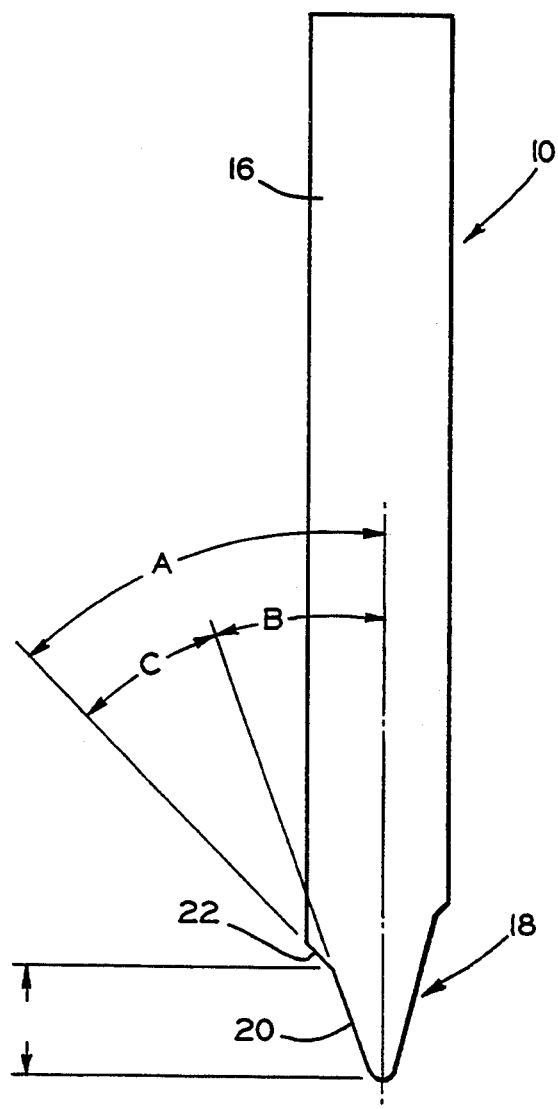
FIG. 2 is a view of the cutter blade of FIG. 1 illustrating the geometry of the blade angle modification.

By modifying the specified blade grinding parameters for forming the cutter blade 10 from a blank, the blade configuration can be altered to incorporate a relief edge 22 having a predetermined axial pressure angle A, which is greater than the axial pressure angle B of the tooth cutting edge 20 by some predetermined amount, as best seen in FIG. 2. Thus, the cutter blade 10 cuts the side 24 of the gear tooth 14 by means of the cutting edge 20, and simultaneously forms a relief 26 on the tip of the gear tooth 14 by means of the relief edge 22.

The blade angle modification is defined by a length increment L and an angle deviation C. The length increment L is the distance from the tip of the cutting member 18 to the intersection of the cutting edge 20 and the relief edge 22. The angle deviation C is the angle between the face of the cutting edge 20 and the face of the relief edge 22. The specific dimensions of the blade angle modification are dependent on the depth of the part to be produced, the amount of angle deviation C desired, and the length increment L. The length increment L and angle deviation C may be varied and optimized experimentally during the development of a specific gear set to produce the desired tip relief. Depending upon the thickness of the blank used to produce the cutter blade, it may not be possible to produce cutter blades having certain combinations of cutting edge axial pressure angle B, length increment L, and angle deviation C, as the relief edge axial pressure angle A may in some configurations project outside of the available blade thickness.

The blade angle deviation C may be very small and still provide a beneficial degree of noise reduction during operation of the gear set. In addition, it is not necessary that the relief edge 22 be straight. The relief edge 22 may comprise a concave portion extending from the end of the cutting edge 20 to the outer edge of the cutter blade shank 14.

The cutter blades 10 of the present invention are secured to the circular cutter head 19 in the conventional manner, and the face hobbing system is operated in the same manner as if conventional cutter blades were employed. Should the cutter blade layout consist of two blades per group, at least one cutter blade 10 in each pair (either all of the inner blades or all of the outer blades) is provided with a relief edge 22 adapted to form a relief 26 on one side of the tip of each tooth 14. Preferably, each cutter blade is provided with a relief edge, so that a relief 26, 26' is formed on both sides of the tip of each tooth 14. Where the blade layout consists of three cutter blades per group, the rougher blade may be provided with a relief edge on its inner edge, its outer edge or, preferably, on both of its edges. Alternatively, a relief edge may be provided on the cutting edge of the inner cutter blade, the outer cutter blade or, preferably, on both the inner and outer cutter blades.

With the tip relief cutter blade 10 of the present invention, a tip relief is produced on the teeth of a gear or pinion member simultaneously with the cutting operation. This allows for greater manufacturing flexibility, as the relief dimensions can be easily modified simply by modifying the length increment L and/or angle deviation C of the cutter blades. In addition, the elimination of a subsequent manufacturing operation improves the consistency of the relief and part quality, as well as reduces manufacturing costs.

As will be appreciated by those skilled in the art, use of the tip relief cutter blade 10 of the present invention would not be beneficial in a conventional face milling operation which produces teeth of tapered depth, since a tip relief of uneven width along the length of the tooth would result.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of producing a spiral bevel or hypoid gear member by a continuous index, face hobbing process, comprising the steps of rotating a circular face hob type cutter head carrying a plurality of cutting members, rotating the gear member in a timed relationship therewith, and effecting a relative feed motion of the cutter head and gear member so that successive cutting members engage successive tooth slots as the gear member is being cut, wherein a plurality of said cutting members include a tooth cutting edge having a given axial pressure angle, and a relief edge adjacent said tooth cutting edge having an axial pressure angle greater than the axial pressure angle of said tooth cutting edge, so that the relief edge of said cutting member simultaneously forms a relief on the tip of the tooth of said gear member as the tooth is cut by the tooth cutting edge of said cutting member.

2. A method as defined in claim 1, wherein said relief edges are formed substantially straight.

3. A method as defined in claim 1, wherein said relief edges are formed as a concave, curved edge.

4. A method as defined in claim 1, wherein each of said cutting members includes a tooth cutting edge having a given axial pressure angle, and a relief edge adjacent said tooth cutting edge having an axial pressure angle greater than the axial pressure angle of said tooth cutting edge.

5. A face hob type cutter for producing a spiral bevel or hypoid gear with uniform depth teeth by a continuous index, face hobbing process, comprising:
   a base;
   a circular cutter body mounted on said base, said body having a longitudinal axis and a cutter face at one end thereof; and
   a plurality of cutter blades having a central axis and mounted on the cutter face of said cutter body, said cutter blades including a tooth cutting edge extending from the distal end of said cutter blades at a given axial pressure angle to a relief edge having an axial pressure angle greater than the axial pressure angle of the tooth cutting edge;
   a means for rotating said cutter body about its axis;
   a means for rotatably mounting the gear;
   a means for rotating the gear in a timed relationship relative to the rotation of said cutter body; and
   a means for effecting a relative feed motion of said cutter body and the gear so that said cutter blades simultaneously cut a plurality of uniform depth gear teeth in the gear and form a relief on the tips thereof in a continuously indexing manner.

6. A face hob type cutter as defined in claim 5, wherein the relief edges of said cutter blades are substantially straight.

7. A face hob type cutter as defined in claim 5, wherein the relief edges of said cutter blades comprise concave, curved edges.

8. A face hob type cutter as defined in claim 5, wherein the axial distance from the distal end of said cutter blades to the intersection of said cutting edges and said relief edges is less than the height of the gear teeth being cut.

9. A face hob type cutter as defined in claim 5, wherein the longitudinal axis of each of said cutter blades is generally parallel with the longitudinal axis of said cutter body.

10. A face hob type cutter as defined in claim 5, wherein said cutter includes a plurality of cutter blades arranged in pairs, each pair of cutter blades comprising a radially inner and a radially outer cutter blade, and wherein each of said inner cutter blades includes a tooth cutting edge extending from the distal end thereof at a given axial pressure angle to a relief edge having an axial pressure angle greater than the axial pressure angle of the tooth cutting edge, said inner cutter blades being adapted to simultaneously cut one side of the teeth of the gear and form a relief on the tips thereof.

11. A face hob type cutter as defined in claim 5, wherein said cutter includes a plurality of cutter blades arranged in pairs, each pair of cutter blades comprising a radially inner and a radially outer cutter blade, and wherein each of said outer cutter blades includes a tooth cutting edge extending from the distal end thereof at a given axial pressure angle to a relief edge having an axial pressure angle greater than the axial pressure angle of the tooth cutting edge, said outer cutter blades being adapted to simultaneously cut one side of the teeth of the gear and form a relief on the tips thereof.

12. A face hob type cutter as defined in claim 5, wherein said cutter includes a plurality of cutter blades arranged in pairs, each pair of cutter blades comprising a radially inner and a radially outer cutter blade, and wherein each of said inner and said outer cutter blades includes a tooth cutting edge extending from the distal end thereof at a given axial pressure angle to a relief edge having an axial pressure angle greater than the axial pressure angle of the tooth cutting edge, said inner and outer cutter blades being adapted to simultaneously cut the sides of the teeth of gear and form a relief on the tips thereof.

* * * * *

UNITED STATES PATENT AND TRADEMARK OFFICE
CERTIFICATE OF CORRECTION

PATENT NO. : 5,374,142                                          Page 1 of 1
DATED      : December 20, 1994
INVENTOR(S) : John E. Masseth It is certified that error appears in the above-identified patent and that said Letters Patent is hereby corrected as shown below:

Drawings,
Sheet 2, add the Drawing, consisting of Fig. 3, as shown on the attached pages.

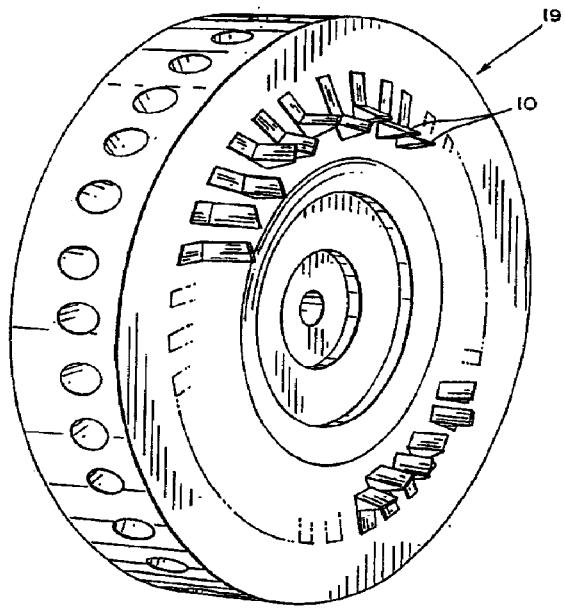

FIG. 3

Signed and Sealed this

Tenth Day of February, 2004

JON W. DUDAS
*Acting Director of the United States Patent and Trademark Office*